Patented Sept. 12, 1933

1,926,524

UNITED STATES PATENT OFFICE 1,926,524

ADHESION OF RUBBER COATINGS TO ALUMINIUM

Francis Gábor, Edward Csutorás, and George László, Budapest, Hungary, assignors to Anode Rubber Company Limited, a company of Guernsey No Drawing. Application October 9, 1930, Serial No. 487,500, and in Great Britain October 10, 1929

6 Claims. (Cl. 91—68)

Our invention relates to an improved process for coating aluminium with hard rubber.

In the production of such coatings it is known to give the surface of the metal, prior to effecting the coating operation, a thorough cleaning by means of alkaline or acid solutions, the object being to obtain a pure metallic surface free of oxide or any other impurities. The clean surface thus prepared must then be covered with a thin coating of some adhesive substance, for example rubber applied in the form of a solution in benzine, in order to obtain adhesion of the coating in the form of hard rubber to the same. Heretofore no adhesion of the coating could be obtained without the use of such an intermediate layer.

According to this invention it has been found that by a suitable pickling it is possible to prepare an aluminium surface upon which perfect adhesion of the hard rubber coating can be secured without having to apply any adhesive intermediate layer.

When a piece of clean aluminium is immersed into a very concentrated or very dilute solution of hydrogen halide such as of hydrochloric acid the aluminium is dissolved more or less rapidly with evolution of hydrogen gas. The surface of the aluminium treated in this way is a corroded one with wrinkles or pits or both, but has a white metallic character. If, however, the acid used is of medium concentration and is employed at raised temperature, the result is very different. Solution takes place as before but the aluminium has a tarnished surface, due to a dark dust resulting from the non-dissolved impurities of the aluminium. Under the dark dust cover the surface of the aluminium shows a similarly corroded surface as described above.

The dark dust is but very little adherent to the metal and can easily be brushed away. No substantial adhesion of a hard rubber coating can be obtained on the brushed surface.

According to this invention it has been found that if aluminium possesses the dark dust surface then a perfect adhesion of a coating of hard rubber to the aluminium can be secured. The aluminium, after removal from the pickling solution which for the purposes of this invention, is a solution of a hydrogen halide of medium concentration, for instance, ordinary concentrated hydrochloric acid and water in equal proportions, is soaked in water and dried, care being taken not to remove too much of the surface layer of dark dust. The essential feature for obtaining the adhesion is the presence of the dark dust on the corroded surface of the aluminium. The dust is due to certain impurities of the aluminium which are not dissolved during the pickling. Thus, for instance, in the case of commercial pure aluminium the dust consists principally of iron and silicon. It is possible to explain the adhesive effect as follows:—

The dark dust produced on the aluminium seems to possess selective adsorption properties both to the aluminium and to the hard rubber. In consequence during the curing a strong adsorption takes place approximating, in the case of aluminium, to something like the first stage of the formation of an alloy and in the case of the hard rubber to a kind of solution in the same. In this way the dust acts as a binding medium between metal and coating.

Another possible explanation of the adhesion can be based upon the softening effect of the dust especially of the finely divided iron contained in the same upon the thin inner layer of the rubber coating during vulcanization. The softened rubber readily penetrates into the minute crevices of the metal surface, thus creating a perfect contact between metal and rubber. The gas-absorbing or gas-binding properties of the dust may also play a certain role in the production of a good adhesion.

The presence of a certain amount of aluminium salts in the pickling solution facilitates the reaction. It is sufficient first to dissolve in the fresh acid solution a small piece of aluminium. Alternatively an aluminium salt may be dissolved in the solution. The concentration of hydrochloric acid in the pickling solution should be chosen so as to be between 10—25 per cent. The temperature of the solution should be above 50° C. In the place of hydrochloric acid the other hydrogen halides, namely hydrobromic acid, hydriodic acid or hydrofluoric acid may be employed. Mixtures of the hydrogen halides may also be used.

The following example serves to illustrate how the pickling can be effected:—

Equal proportions of commercial concentrated hydrochloric acid and water are mixed together and a piece of aluminium, in weight equivalent to 2 grs. of aluminium per each litre of acid solution is dissolved therein. The aluminium articles are thoroughly cleaned in the usual way either mechanically or chemically or even electrochemically and are then immersed in the aforesaid acid solution heated to 60° C. preferably for half a minute to two minutes. Usually the reaction heat is sufficient to maintain the temperature of the bath, if pickling is performed continuously. A violent evolution of hydrogen takes place and considerable quantities of aluminium are dissolved. The articles are then withdrawn, soaked in water and dried. They are then ready for the coating. Care must be taken to avoid the taking off of too much of the dark dust from the aluminium surface during the soaking and the subsequent operations.

The coating of the aluminium can take place in any known manner, for example by the application to the same of calendered rubber sheets of appropriate composition to yield hard rubber, or by single or repeated application of rubber compositions adapted to yield hard rubber in the form of solutions or dispersions in organic solvents or in the form of aqueous dispersions, or by any suitable combination of such treatments.

In an embodiment of the invention an aluminium plate having its surface prepared in the above described manner from aluminium containing 0.25% of iron and 0.30% of silicon, the remainder being aluminium, was coated with hard rubber according to the process described in British Patent No. 10484/29. For this purpose the prepared plate was first dipped into a rubber dispersions having the following composition:—

| | |
|---|---|
| Rubber (latex) | 100 |
| Sulphur | 40 |
| Brown substitute | 10 |
| Paraffin oil | 5 |
| Accelerator and antiager | 5 |

The total dry substance content of the dispersion was 45% and its alkalinity was 0.10% of hydroxyl ions.

After withdrawal from the mix the plate was given a rotary movement for a few minutes in order to distribute evenly the adherent liquid on its surface. After drying this first coating the plate was dipped into a solution containing 6% acetic acid in benzol. After withdrawal and evaporation of the benzol it was immersed for thirty seconds in the dispersion referred to above.

The plate with withdrawn, dried and cured in the usual way.

If a thicker coating is desired, the aforementioned dipping operations are repeated after each drying.

The quality of the hard rubber and its adhesion to the metal can be further improved by immersing the coated objects, before curing, in flowing tap water for a few hours, followed by a further drying.

The adhesion of hard rubber coatings to the aluminium obtained in accordance with this invention is of the order of 200 kilogrammes per square centimetre whereas with the processes hitherto known adhesions of the order of only 80 kilogrammes per square centimetre have been obtained.

It should be understood that the expression aluminium for the purpose of this invention is deemed to include the various kinds of aluminium and also aluminium alloys principally consisting of aluminium but containing no copper or only small quantities of copper. The presence of copper in appreciable quantities is detrimental and must be avoided.

Having described our invention what we claim is:

1. An improved process for coating aluminium with hard rubber, which comprises treating aluminium with a hydrogen halide solution of medium concentration, until on removing the aluminium, washing and drying it, a dark powder remains upon the surface; applying a rubber composition directly to the prepared surface subsequently curing the whole.

2. A process as claimed in claim 1, wherein concentration of the halide in the halide solution is between 10% and 25%.

3. A process as claimed in claim 1 wherein the rubber is applied to the prepared aluminium surface as an aqueous dispersion.

4. A method of coating aluminium with hard rubber which comprises treating the surface of the aluminium at an elevated temperature with a solution of an acid halide of a concentration to dissolve the aluminium without dissolving the iron and silicon contained therein and applying a coating of rubber composition to said surface and vulcanizing.

5. The method of coating aluminium with hard rubber which comprises treating the surface of the aluminium at a temperature of about 60° C. with a solution of an acid halide of a concentration sufficient to dissolve the aluminium and not to dissolve the iron and silicon contained therein, applying a layer of rubber composition to said surface and vulcanizing.

6. A method of coating aluminium and its alloys with hard rubber which comprises treating the surface of the aluminium to remove the aluminium from the surface, leaving the iron and silicon contained therein, applying a coating of rubber composition to the thus treated surface, and vulcanizing it thereon.

FRANCIS GÁBOR.
EDWARD CSUTORÁS.
GEORGE LÁSZLÓ.